No. 12,217. REISSUED MAY 3, 1904.

Z. B. WEBB.

FOLDING BOX.

APPLICATION FILED FEB. 4, 1903.

Attest:
T. F. Lehse
W. T. Kennedy

Inventor:
Zaida B. Webb
by Philipp Sanger Rice & Kennedy
Attys

No. 12,217. Reissued May 3, 1904.

UNITED STATES PATENT OFFICE.

ZAIDA B. WEBB, OF FLORHAM PARK, NEW JERSEY, ASSIGNOR TO THE WEBB FOLDING BOX COMPANY, OF NEWARK, NEW JERSEY, A CORPORATION OF NEW JERSEY.

FOLDING BOX.

SPECIFICATION forming part of Reissued Letters Patent No. 12,217, dated May 3, 1904.

Original No. 690,496, dated January 7, 1902. Application for reissue filed February 4, 1903. Serial No. 141,934.

*To all whom it may concern:*

Be it known that I, ZAIDA B. WEBB, of Florham Park, Morris county, New Jersey, have invented certain new and useful Improvements in Folding Boxes, of which the following is a full, clear, and exact description.

My invention relates to improvements in folding boxes; and the object of my invention is to make a simple and cheap folding box which can be set up without the use of glue, which can be easily manipulated so as to set it up for use and fold it out flat, and which when in position for use has the parts interlocked and fastened in a way to make the box exceptionally secure.

To these ends my invention consists of a folding box, the construction and arrangement of which will be hereinafter described and claimed.

Reference is to be had to the accompanying drawings, forming part of this specification, in which similar figures of reference refer to similar parts throughout both views.

Figure 1:
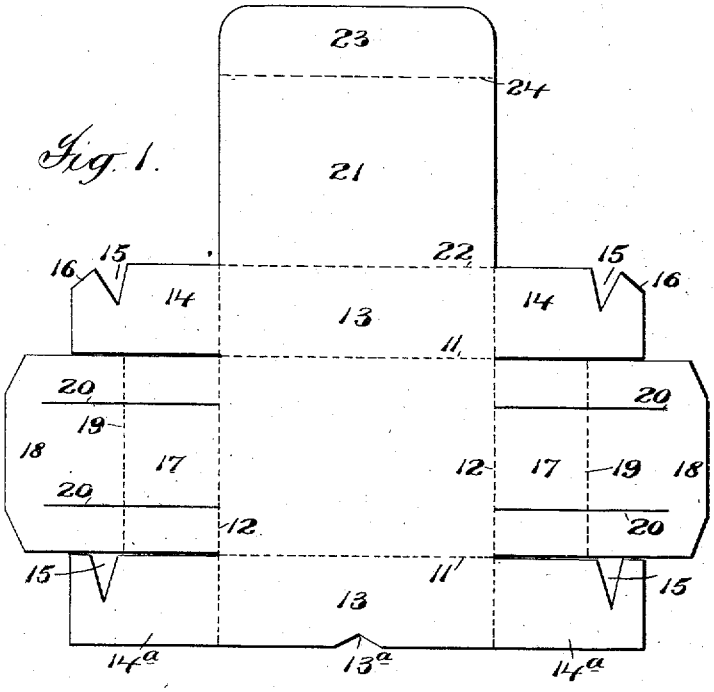
Figure 2:
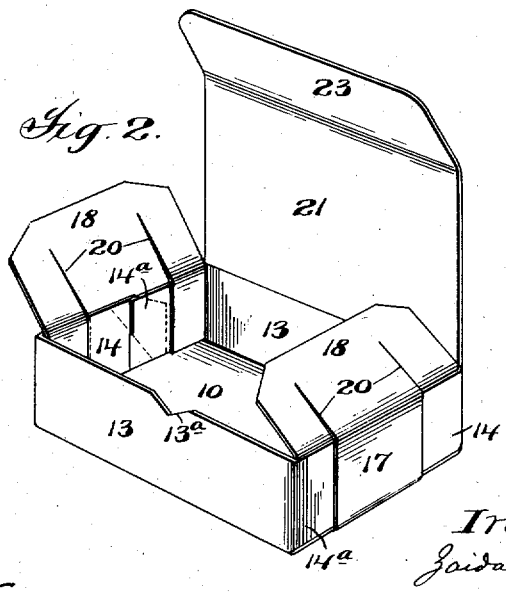

Figure 1 is a detail of the box-blank, and Fig. 2 is a perspective view of the open box.

The box has a rectangular bottom portion 10, which is formed between the parallel side score-lines 11 and the end score-lines 12, and the side score-lines are prolonged so as to cross the side pieces 13, which project from opposite side edges of the box-bottom and separate the said side pieces from the flaps 14 14ª, which are formed on the ends of the side pieces and which when the side pieces are turned up perpendicular to the box-bottom are adapted to fold inward, engage each other, and assist in forming the box ends. One of the side pieces has a finger-notch 13ª to facilitate grasping the top or cover when the box is to be opened.

The flaps 14 14ª have notches 15 to enable them to be interlocked at the box ends, these notches being triangular incisions extending approximately half-way across the flaps, and the notches in the flaps 14 are made in the upper or outer edge, while the notches in the flaps 14ª are made in the under or inner edge, and the flaps 14 are cut away slightly at the outer and upper corners, as shown at 16, so that the two sets of flaps may be more readily placed in engagement. This scheme for locking flaps together is not in itself new, and the opposed flaps are engaged by locking the notched part of one upon the notched part of the other, as shown clearly in Fig. 2.

Projecting from the end edges of the box-bottom 10 are the end pieces 17, which are adapted to be turned up in forming the box ends, and each end piece has at its free edge a flap 18, adapted to be turned inwardly into the box to protect the contents thereof, and the flap has another purpose, too—that of giving sufficient body to the box end to receive the parallel slots 20, which extend from the score-lines 12 outward in each box end. The flaps 18 are separated from the end pieces 17 by the score-lines 19, although it will be understood that wherever score-lines are shown and referred to it is because they are used as a convenience and not as a necessity.

By having the end pieces 17 extended into the flaps 18, so that the slots 20 may be appropriately placed, sufficient stock is provided to prevent the slots from tearing out, and, furthermore, the slots being long enables them to readily receive the binding or locking flaps 14 14ª, as will be presently described.

The box has preferably a top or cover 21 of the kind usual to folding boxes, this being separated from the side piece 13 by a score-line 22, and the cover or top, which is of the same size as the bottom 10, has a terminal flap 23, which is separated from the top or cover by a score-line 24 and is adapted when the box is closed to be tucked down between the front side 13 of the box and the box contents, the flap being further bound by the protective flaps 18.

When the box is to be set up, the end pieces are turned up, with the flaps 18 sticking up comparatively straight, and the side pieces 13 are also brought up to a perpendicular position, while the flaps 14 14ª are turned inward and their ends thrust through the slots 20 of the end pieces. As this is done the flaps 14 are brought underneath and the flaps 14ª closed down upon them, so that the notched portions 15 of the two flaps at each end interlock, and thus the whole box is fastened firmly in place. This fastening is made still more secure when the flaps 18 are turned inward to cover the box-top, as this act absolutely locks the flaps 14 and 14ª, so that they can be displaced only by being torn out. Thus when the cover 21 is closed down and the flap 23 tucked in a package is formed which is not only very neat in appearance, but which is perfectly secure.

It will be seen from the foregoing description that the box is of great simplicity, that it can be set up almost instantly, and that the box is well adapted for any of the uses to which such articles are put. It will be further observed that the parallel slots 20 make in the box end a strap or keeper which covers and binds the interlocked portions of the flaps 14 14ª.

Having thus described my invention, what I claim as new, and desire to secure by Letters Patent, is—

1. As an improved article of manufacture, a folding box comprising a bottom portion, end pieces projecting from two edges of the bottom portion, said end pieces being provided with extension-flaps adapted to fold inward as usual, keepers or straps formed on the end pieces and flaps by making slots, which slots extend from the end pieces up into the extension-flaps, side pieces on the two remaining edges of the bottom, and end flaps projecting from the end portions of the side pieces, said flaps being notched and adapted to be tucked through the slots in the end pieces and their extensions and engage with each other so that when engaged they will be bound in place by the aforesaid straps or keepers.

2. As an improved article of manufacture, a folding box comprising a bottom portion, side pieces projecting from opposite edges of the bottom portion, said side pieces having flaps at the ends which are arranged to fold inward across the box ends and engage with each other, and end pieces on the two remaining edges of the bottom portion, said end pieces having extension-flaps adapted to fold inward into the formed box, and each end piece having a slot formed partly in the end piece proper and partly in its extension-flap, the said slot being adapted to receive and fasten an engageable flap, and the extensions of the end pieces forming locks to prevent the disengagement of the engaged flaps.

3. A folding box having pieces extending from the four edges of the bottom to form the side and end walls of the box, one of said wall-pieces having an extension-flap adapted to fold inward, and the wall-pieces adjacent to said wall-piece, each having an end flap adapted to fold inward and lie parallel with said wall-piece, and said wall-piece having a slot formed partly in the wall-piece proper and partly in the extension-flap, said slot being adapted to receive and fasten an end flap.

In testimony whereof I have signed my name to this specification in the presence of two subscribing witnesses.

ZAIDA B. WEBB.

Witnesses:
W. H. KENNEDY,
A. L. KENT.